(12) United States Patent  (10) Patent No.: US 9,276,697 B2
Shimizu  (45) Date of Patent: Mar. 1, 2016

(54) NETWORK EVALUATION APPARATUS AND NETWORK EVALUATION METHOD

(75) Inventor: Sho Shimizu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 68 days.

(21) Appl. No.: 13/535,624

(22) Filed: Jun. 28, 2012

(65) Prior Publication Data

US 2013/0022353 A1  Jan. 24, 2013

(30) Foreign Application Priority Data

Jul. 22, 2011  (JP) ................. 2011-161179

(51) Int. Cl.
*H04B 10/00* (2013.01)
*H04J 14/02* (2006.01)
*H04L 12/721* (2013.01)
*H04L 12/751* (2013.01)

(52) U.S. Cl.
CPC ......... *H04J 14/0256* (2013.01); *H04J 14/0267* (2013.01); *H04J 14/0269* (2013.01); *H04L 45/123* (2013.01); *H04J 14/0271* (2013.01); *H04J 14/0284* (2013.01); *H04L 45/02* (2013.01); *H04L 45/62* (2013.01)

(58) Field of Classification Search
USPC ....................................... 398/58–64
See application file for complete search history.

(56) References Cited

U.S. PATENT DOCUMENTS

| | | | |
|---|---|---|---|
| 6,545,781 B1 * | 4/2003 | Chang et al. | 398/51 |
| 6,895,182 B1 * | 5/2005 | Moriyama et al. | 398/3 |
| 6,996,342 B2 * | 2/2006 | Park et al. | 398/48 |
| 7,308,198 B1 * | 12/2007 | Chudak et al. | 398/58 |
| 7,315,693 B2 * | 1/2008 | Ovadia et al. | 398/57 |
| 7,340,169 B2 * | 3/2008 | Ovadia et al. | 398/57 |
| 7,362,974 B2 * | 4/2008 | De Patre et al. | 398/50 |
| 7,454,138 B2 * | 11/2008 | Nozu | 398/25 |
| 7,630,635 B1 * | 12/2009 | Guy et al. | 398/49 |
| 7,630,649 B2 * | 12/2009 | Oki et al. | 398/177 |
| 7,720,390 B2 * | 5/2010 | Oki et al. | 398/158 |
| 7,941,047 B2 * | 5/2011 | Zhou et al. | 398/15 |
| 8,055,128 B2 * | 11/2011 | Feldman | 398/25 |
| 8,150,257 B1 * | 4/2012 | Choudhury et al. | 398/5 |
| 8,155,522 B2 * | 4/2012 | Zolfaghari | 398/59 |
| 8,270,829 B2 * | 9/2012 | Hashiguchi et al. | 398/34 |
| 8,644,703 B2 * | 2/2014 | Mukherjee | 398/5 |
| 8,682,176 B2 * | 3/2014 | Xie | 398/175 |
| 2003/0099014 A1 * | 5/2003 | Egner et al. | 359/124 |
| 2003/0147645 A1 * | 8/2003 | Imajuku et al. | 398/7 |
| 2005/0069314 A1 * | 3/2005 | De Patre et al. | 398/5 |

(Continued)

OTHER PUBLICATIONS

B. Mukherjee, Optical WDM Networks, pp. 444-446, Springer, Jan. 13, 2006.

*Primary Examiner* — Agustin Bello
(74) *Attorney, Agent, or Firm* — Staas & Halsey LLP

(57) ABSTRACT

A network evaluation apparatus that evaluates a design of an optical network, the network evaluation apparatus including: a processor that selects two nodes, between which a lightpath is to be set up, from a plurality of nodes based on a traffic volume demand values, calculates a decreased amount of cost based on numbers of the plurality of nodes and a plurality of routers for relaying a signal transmitted between the two nodes selected, calculates an increased amount of cost based on a transmission distance of the lightpath and a number of a plurality of repeaters to be inserted according to a segment distance, and determines a value of the optical network based on the decreased amount of cost and the increased amount of cost.

12 Claims, 12 Drawing Sheets

(56) References Cited

U.S. PATENT DOCUMENTS

| | | |
|---|---|---|
| 2005/0185967 A1* | 8/2005 | Hoshida .................... 398/173 |
| 2005/0244161 A1* | 11/2005 | Satoh ........................ 398/85 |
| 2006/0002716 A1* | 1/2006 | Guy et al. .................. 398/175 |
| 2006/0067694 A1* | 3/2006 | Nozu ......................... 398/83 |
| 2006/0067702 A1* | 3/2006 | Alicherry et al. ........... 398/160 |
| 2008/0159742 A1* | 7/2008 | Krishnaswamy et al. ...... 398/79 |
| 2009/0274067 A1* | 11/2009 | Zolfaghari ................. 370/254 |
| 2010/0014859 A1* | 1/2010 | D'Alessandro et al. ........ 398/48 |
| 2010/0028006 A1* | 2/2010 | Guy et al. .................. 398/79 |
| 2010/0166421 A1* | 7/2010 | Hashiguchi et al. .......... 398/26 |
| 2011/0150470 A1* | 6/2011 | Jenkins et al. .............. 398/58 |
| 2011/0182576 A1* | 7/2011 | Zhou et al. ................. 398/34 |
| 2012/0251103 A1* | 10/2012 | Solheim et al. .............. 398/34 |
| 2013/0022353 A1* | 1/2013 | Shimizu ..................... 398/34 |
| 2013/0302033 A1* | 11/2013 | Sriram et al. ............... 398/49 |
| 2013/0330081 A1* | 12/2013 | Solheim et al. .............. 398/79 |
| 2014/0099119 A1* | 4/2014 | Wei et al. ................... 398/79 |

* cited by examiner

| START POINT | END POINT | LENGTH (KM) |
|---|---|---|
| A | F | 500 |
| F | 50 | 300 |
| 50 | 51 | 200 |
| 51 | E | 300 |
| F | 52 | 200 |
| 52 | D | 400 |
| F | 53 | 1100 |
| 53 | 54 | 1400 |
| 54 | C | 900 |
| F | 55 | 1100 |
| 55 | B | 1200 |

| SOURCE NODE | DESTINATION NODE | LENGTH (KM) |
|---|---|---|
| A | B | 8Gbps |
| A | C | 5Gbps |
| A | D | 7Gbps |
| A | E | 4Gbps |

| | DESIGNATED SEGMENT | TRAFFIC VOLUME | HOP COUNT | DECREASED VALUE | INCREASED VALUE | EVALUATION VALUE |
|---|---|---|---|---|---|---|
| 71 | A → B | 8 Gbps | 3 | 96 | 32 | 64 |
| 72 | A → C | 5 Gbps | 4 | 90 | 30 | 60 |
| 73 | A → D | 7 Gbps | 3 | 84 | 0 | 84 |
| 74 | A → E | 4 Gbps | 4 | 72 | 0 | 72 |

| | LINK | PASSING DESIGNATED SEGMENT | LIGHTPATH SEGMENT | NUMBER OF USED WAVELENGTHS |
|---|---|---|---|---|
| 95 | A-F | A→B, A→C, A→D, A→E | A → D | 2 |
| 96 | F-55 | A → B | - | 1 |
| | 55-B | A → B | - | 1 |
| | F-53 | A → C | - | 1 |
| | 53-54 | A → C | - | 1 |
| | 54-C | A → C | - | 1 |
| 97 | F-52 | A → D | A → D | 2 |
| | 52-D | A → D | A → D | 2 |
| | F-50 | A → E | - | 1 |
| | 50-51 | A → E | - | 1 |
| | 51-E | A → E | - | 1 |

Columns: 91, 92, 93, 94

| | SEGMENT | TRAFFIC VOLUM | HOP COUNT | DECREASED VALUE | INCREASED VALUE | EVALUATION VALUE |
|---|---|---|---|---|---|---|
| 71 | A → B | 8 Gbps | 3 | 96 | 32 | 64 |
| 72 | A → C | 5 Gbps | 4 | 90 | 30 | 60 |
| 74 | A → E | 4 Gbps | 4 | 72 | 0 | 72 |

| | 91 | 92 | 93 | 94 |
|---|---|---|---|---|
| | LINK | PASSING DESIGNATED SEGMENT | LIGHTPATH SEGMENT | NUMBER OF USED WAVELENGTHS |
| 95a | A-F | A→B,A→C,A→D,A→E | A→D,A→E | 3 |
| 96 | F-55 | A → B | - | 1 |
| | 55-B | A → B | - | 1 |
| | F-53 | A → C | - | 1 |
| | 53-54 | A → C | - | 1 |
| | 54-C | A → C | - | 1 |
| 97 | F-52 | A → D | A → D | 2 |
| | 52-D | A → D | A → D | 2 |
| 98 | F-50 | A → E | A → E | 2 |
| | 50-51 | A → E | A → E | 2 |
| | 51-E | A → E | A → E | 2 |

NETWORK EVALUATION APPARATUS AND NETWORK EVALUATION METHOD

CROSS-REFERENCE TO RELATED APPLICATIONS

This application is based upon and claims the benefit of priority of the prior Japanese Patent Application No. 2011-161179, filed on Jul. 22, 2011, the entire contents of which are incorporated herein by reference.

FIELD

The embodiments discussed herein are related to a network evaluation apparatus that evaluates topologies of optical networks.

BACKGROUND

To accommodate traffic increase in networks, optical networks that use optical fibers are being used in core networks. The optical network allows for very high capacity communication by employing a wavelength division multiplexing (WDM) technology that multiplexes a plurality of different wavelengths in a single optical fiber.

A WDM network includes a plurality of nodes, which are referred to as optical cross connects (OXCs), and optical fibers that provide connections between the nodes. The OXC is capable of creating a logical communication path, which is referred to as a lightpath, as an optical layer in between arbitrary nodes. The lightpath is actualized by setting a wavelength that may be commonly shared between two nodes. Setting a single lightpath allows creation of a logical high capacity communication path that corresponds to a capacity of one wavelength between two nodes.

An upper layer of the WDM network includes an internet protocol (IP) layer. In the IP layer, information from a user is transmitted and received on a packet by packet basis. In the WDM network, a router is connected to each OXC. A packet signal arrived at each OXC is analyzed by the router and forwarded to a forwarding destination OXC.

A network including the optical layer and the IP layer is referred to as an IP/WDM network. In the IP/WDM network, packets transmitted from users are aggregated by the router. Aggregated packets are forwarded to other nodes using the optical layer, which is a lower layer when viewed from the IP layer, as a transmission path.

Even if one or other nodes exist physically in the transmission path between two nodes, it is recognized that the two nodes are adjacent to each other when they are viewed from the IP layer in a case where the lightpath is set up therebetween in the optical layer. Each of the other nodes existing between the two nodes, between which the lightpath is set up, performs a process for switching an optical signal path by the OXC. The optical signal processed by the OXC does not go through the router. Accordingly, optical signals in the optical layer are not processed on a packet by packet basis. Such a process of the optical signals, which does not involve the router, is referred to as a cut-through.

Compared to forwarding by the lightpath, a complicated process is typically performed in the IP layer. The process includes operations such as converting an optical signal received at the OXC to an electrical signal, identifying a forwarding destination for each packet at the router based on the electrical signal converted, and forwarding the packet to the forwarding destination identified. The more complicated the process becomes, the higher the router performance is desirable. Accordingly, a network cost rises as the volume of signal processing in the IP layer increases.

An IP/WDM network design is carried out by selecting one or more lightpaths in such a way that a cost of the whole network is reduced by using, as inputs, a set of start point nodes, end point nodes, and traffic volume information flowing between the respective pairs of nodes, and a physical topology of the optical layer. A topology that is logically constructed with one or more lightpaths is referred to as a logical topology. Mukherjee (B. Mukherjee, "Optical WDM Networks", Springer, 2006) teaches a maximizing multi-hop traffic (MMT) algorithm as an evaluation technology of the IP/WDM network design. In the MMT algorithm, the logical topology that reduces the cost of the whole network is obtained by setting the lightpath in between two nodes where the traffic volume is large as well as the number of relaying routers (hop count) is large.

SUMMARY

According to an aspect of the invention, a network evaluation apparatus that evaluates a design of an optical network, the network evaluation apparatus includes a memory that stores transmission distances and traffic volume demand values of links respectively, and a segment distance at which a repeater of a plurality of repeaters is inserted to compensate an optical transmission loss, the links coupling two nodes of a plurality of nodes that is included in the optical network, each of the plurality of nodes providing each of a plurality of routers respectively, each of the plurality of routers detecting a forwarding destination of a signal going through the link, and a processor that selects two nodes, between which a lightpath is to be set up, from the plurality of nodes based on the traffic volume demand values, calculates a decreased amount of cost based on numbers of the plurality of nodes and the plurality of routers for relaying a signal transmitted between the two nodes selected, calculates an increased amount of cost based on a transmission distance of the lightpath and a number of the plurality of repeaters to be inserted according to the segment distance, and determines a value of the optical network based on the decreased amount of cost and the increased amount of cost. The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5A is a table diagram illustrating a physical topology of the IP/WDM network, and FIG. 5B is a table diagram illustrating demand data of the IP/WDM network;

FIG. 7 is an evaluation result table indicating total costs of their respective demands;

FIG. 9 is a wavelength count table that manages the number of used wavelengths in each link after setting up the lightpath in the segment AD;

FIG. 10 is an evaluation result table indicating total costs of their respective designated segments after setting up the lightpath between nodes A and D;

FIG. 12 is a wavelength count table that manages the number of used wavelengths in each link after setting up the lightpaths in the segments AD and AE.

DESCRIPTION OF EMBODIMENTS

When a distance between two nodes, between which a lightpath is set up, becomes large, it is preferable to have an optical regenerator in an OXC through which the lightpath passes. The optical regenerator is a repeater that shapes optical signals. The MMT algorithm does not evaluate such a two-node distance. Accordingly, an installation cost of an optical regenerator based on the two-node distance, between which the lightpath is set up, is not evaluated.

An object of a present technology discussed herein is to evaluate a network topology while considering a cost increase due to the installation of an optical regenerator based on the two-node distance between which a lightpath is set up.

Below, embodiments will be described. It should be noted that a combination of constituting elements of different embodiments may also be included in the embodiments.

Figure 1:
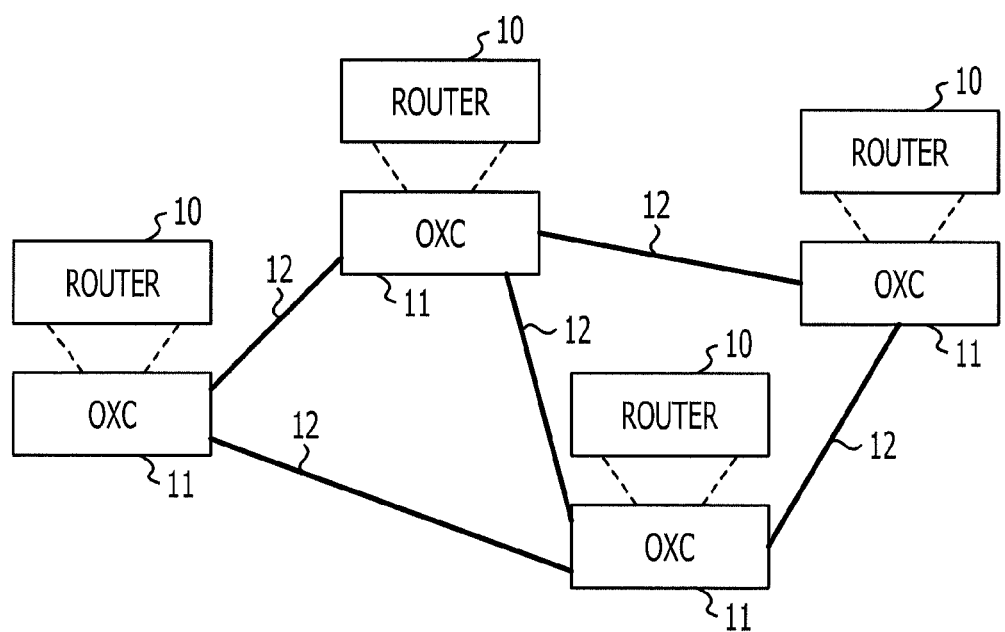
FIG. 1 is a block diagram of an IP/WDM network.

FIG. 1 is a block diagram of a typical IP/WDM network 1. The IP/WDM network 1 includes a plurality of OXCs 11, routers 10 each connecting to their respective OXCs 11, and optical cables 12 connecting two OXCs 11. The optical cable functions as a link connecting nodes.

The OXC 11 may be able to cross-connect with another OXC 11 to route optical signals as they are on a wavelength basis, without converting the optical signal to an electrical signal. The optical cable 12 connects between the OXCs 11. A physical topology of the optical layer is formed from the OXCs 11 and the optical cables 12.

The OXC 11 converts the optical signal received from another OXC 11 to an electrical signal, and transmits the electrical signal to the router 10. The router 10 processes a received electrical signal on a packet by packet basis, and determines a forwarding destination of the signal. In a physical layer of the IP layer, signals are transmitted and received on a packet by packet basis.

The optical signal in the optical layer received by the OXC 11 is converted to the electrical signal, and transmitted to the router 10 that is connected to the OXC 11. When traffics passing through nodes of a network are analyzed, the majority of processes taking place in each node are typically classified as a replay process. Accordingly, the relay process in the IP layer may be reduced by providing an effective cut-through with the lightpath. The reduction of the relay process in the IP layer may be able to reduce the number or sizes of the routers 10.

On the other hand, the optical signal attenuates as the lightpath length becomes longer. When the optical signal attenuates, the possibility of failure in receiving correct signal values may increase at a receiver-side node. When the optical signal is converted to the electrical signal at the OXC 11, the electrical signal is converted back to an optical signal. Accordingly, the attenuated optical signal may be restored.

On the other hand, when the lightpath is set up, the optical signal attenuates without being converted back from the electrical signal. When a transmission distance of the lightpath becomes large, it is desirable to install an optical regenerator in the OXC 11 to restore the attenuated optical signal. As a result, a cost of the optical regenerator installation increase further as the transmission distance between the nodes, between which the lightpath is set up, becomes larger.

As described above, there may be a cost decrease and a cost increase in the IP/WDM network 1 when the lightpath is set up between certain nodes.

Figure 2:
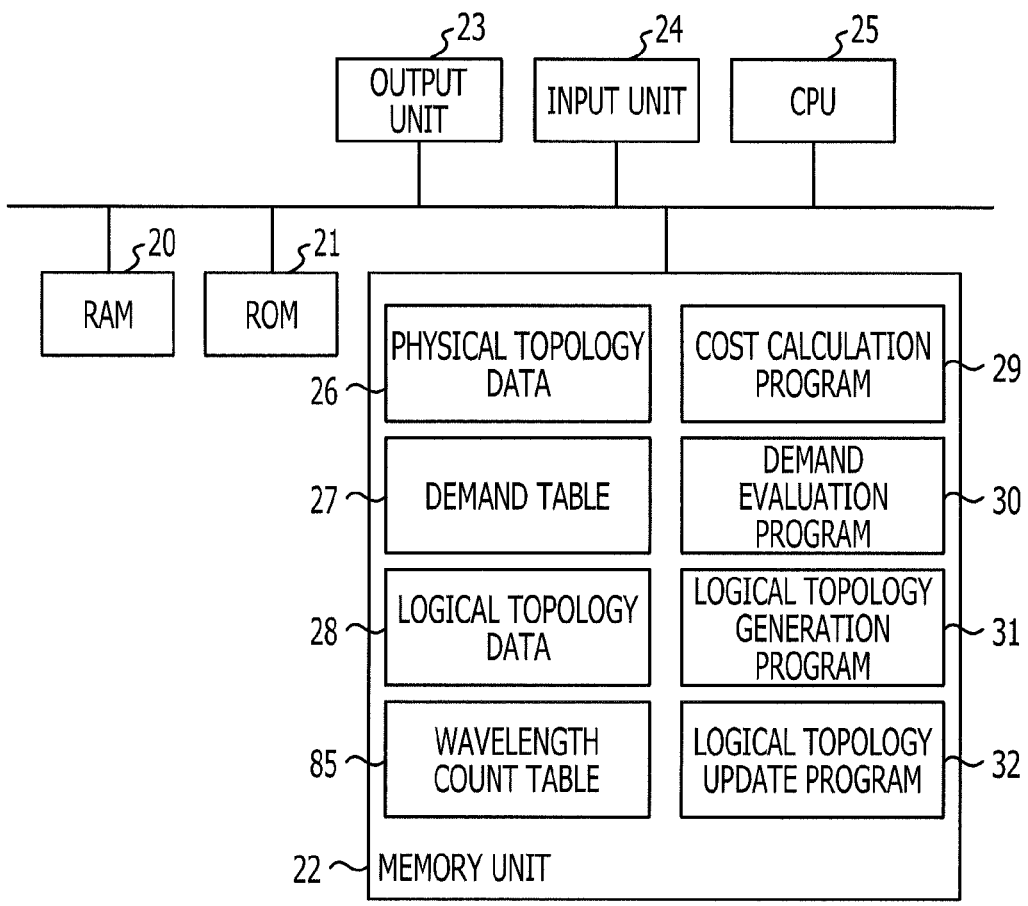
FIG. 2 is a block diagram of a network evaluation apparatus.

FIG. 2 is a block diagram of a network evaluation apparatus 2 that evaluates the network topology of the IP/WDM network 1. The network evaluation apparatus 2 includes a RAM (Random Access Memory) 20, a ROM (Read Only Memory) 21, a memory unit 22, an output unit 23, an input unit 24, and a CPU (Central Processing Unit) 25.

The RAM 20 is a memory device that electrically reads and writes data. Data stored in the RAM 20 will be lost when a power of the network evaluation apparatus 2 is turned off. The RAM 20 temporarily stores programs to be executed by the CPU 25 and execution results of the programs.

The ROM 21 is a memory device that electrically reads and writes data. Data stored in the ROM 21 will be retained even when the power of the network evaluation apparatus 2 is turned off. The ROM 21 stores firmware of the network evaluation apparatus 2.

The memory unit 22 stores programs to be executed by the CPU 25, data to be evaluated by the programs, and execution results of the programs. The memory unit 22 may be, for example, a hard disk, etc. The memory unit 22 stores physical topology data 26, a demand table 27, logical topology data 28, a wavelength count table 85, a cost calculation program 29, a demand evaluation program 30, a logical topology generation program 31, and a logical topology update program 32.

The physical topology data 26 is physical network topology information of the IP/WDM network 1 to be evaluated. The physical topology data 26 also includes the number of wavelengths that may be multiplexed at each link. The demand table 27 is information regarding demands that are desirable in between certain pairs of nodes. The demand is information defined by a source node, a destination node, and traffic volume demand value of signals that flow through those nodes. The logical topology data 28 is logical network topology information of the IP/WDM network 1. The initial value of the logical topology data 28 is determined based on the physical topology data 26. The wavelength table 85 is information for keeping track of the number of used wavelengths in each link. For each link, the upper limit is already decided in the number of wavelengths that may be multiplexed. Thus, the remaining number of wavelengths available for multiplexing in each link may be confirmed based on the wavelength count table 85.

The cost calculation program 29 is a program that causes the CPU 25 to calculate a cost associated with a topology change. The demand evaluation program 30 is a program that causes the CPU 25 to evaluate whether or not each of network paths between the nodes, which relate to the topology change, satisfies a corresponding demand value specified in the demand table 27. The logical topology generation program 31 is a program that causes the CPU 25 to generate the initial value of the logical topology data 28 based on the physical topology data 26. The logical topology update program 32 is a program that causes the CPU 25 to set up the lightpath between certain nodes and store logical network topology data of after setting up the lightpath as the logical topology data 28.

Note that the data 26-28 and the programs 29-32 described above may not be stored in the memory unit 22. Alternatively, for example, the data 26-28 and the programs 29-32 may be stored in a "portable physical medium" such as a flexible disk (FD), CD-ROM, MO disc, DVD disc, magneto-optical disc, IC card, etc., which is to be inserted into the network evaluation apparatus 2; or a "fixed physical medium" such as a ROM 21, etc., which is provided inside or outside the network evaluation apparatus 2; or "another computer (or server)" which connects to the network evaluation apparatus 2 via a public circuit, Internet, LAN, WAN, etc. The network evaluation apparatus 2 may read and execute the program from one of those devices.

The output unit 23 outputs evaluation results of the network evaluation apparatus 2 to outside thereof. The output unit 23 may be, for example, a display.

The input unit 24 inputs evaluation conditions to be used in the network evaluation apparatus 2. The input unit 24 may be, for example, a keyboard, a mouse, etc.

The CPU 25 is a processor device that executes programs read out from the memory unit 22.

As described above, the network evaluation apparatus 2 may be able to evaluate a network topology cost by causing the CPU 25 to execute the programs stored in the memory unit 22 based on the data stored in the memory unit 22.

Figure 3:
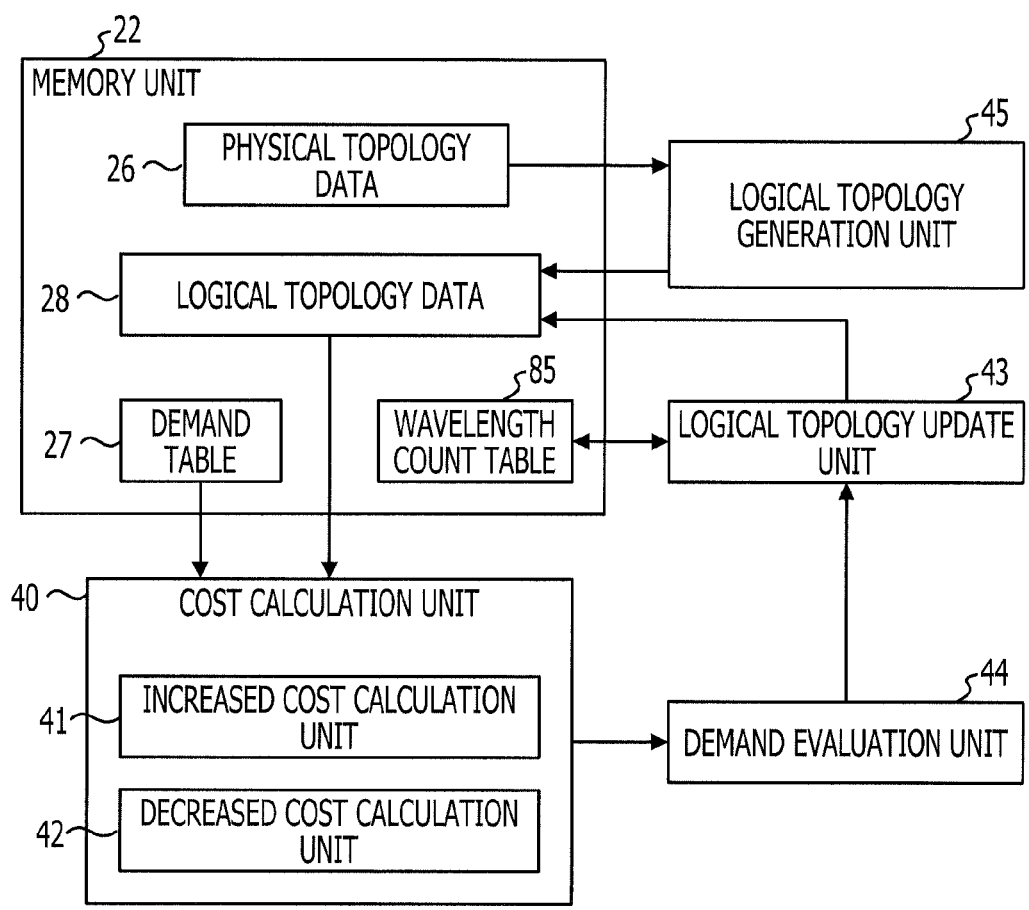
FIG. 3 is a functional block diagram of the network evaluation apparatus.

FIG. 3 is a functional block diagram of the network evaluation apparatus 2. A logical topology generation unit 45 is a functional block actualized by the CPU 25 when the CPU 25 is executing the logical topology generation program 31. The logical topology generation unit 45 generates the logical topology data 28 based on the physical topology data 26 and the demand table 27.

A cost calculation unit 40 is a functional block actualized by the CPU 25 when the CPU 25 is executing the cost calculation program 29. The cost calculation unit 40 selects one of the demands based on the demand table 27, and performs a cost calculation for a case where the transmission of the demand selected is changed to the lightpath. The cost calculation unit 40 includes an increased cost calculation unit 41 and a decreased cost calculation unit 42. The increased cost calculation unit 41 calculates an increased amount of cost associated with the change to the lightpath. The decreased cost calculation unit 42 calculates a decreased amount of cost associated with the change to the lightpath. The cost calculation unit 40 calculates the total cost associated with the change to the lightpath in between selected two nodes, based on cost calculation results of the increased cost calculation unit 41 and the decreased cost calculation unit 42.

A demand evaluation unit 44 is a functional block actualized by the CPU 25 when the CPU 25 is executing the demand evaluation program 30. The demand evaluation unit 44 selects the demand of the highest evaluation value as the demand for which the lightpath is to be set up, based on the cost calculation results of the cost calculation unit 40.

A logical topology update unit 43 is a functional block actualized by the CPU 25 when the CPU 25 is executing the logical topology update program 32. The logical topology update unit 43 stores a logical topology for which the lightpath is set up as the logical topology data 28 in the memory unit 22, based on an evaluation result of the demand evaluation unit 44. Furthermore, the logical topology update unit 43 records a cost calculation result of the whole network based on the logical topology data 28 thus updated.

As described above, the network evaluation apparatus 2 may be able to actualize functions desirable for the network evaluation by causing the CPU 25 to execute the programs stored in the memory unit 22.

Figure 4:
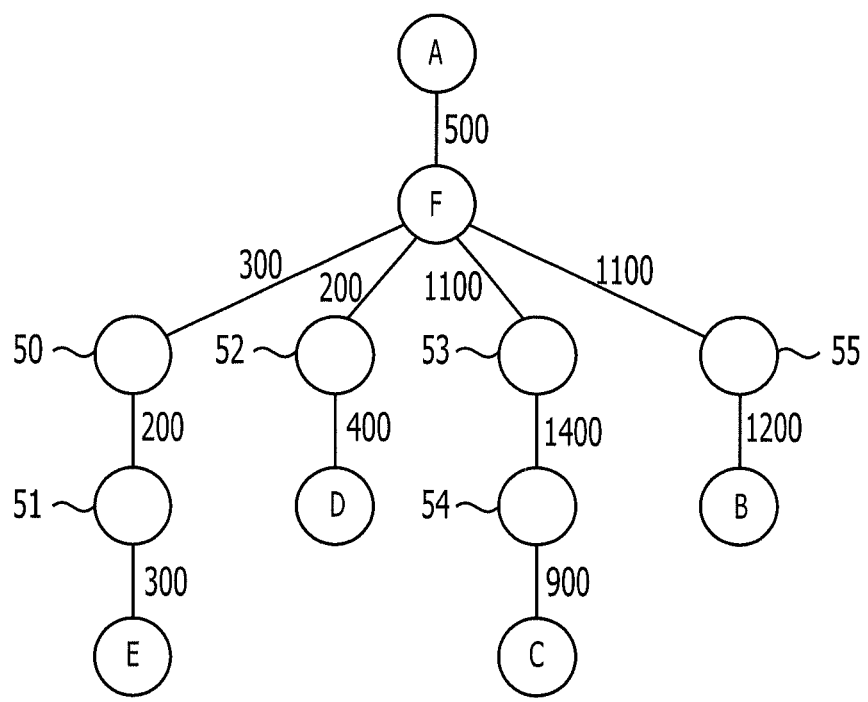
FIG. 4 is a block diagram of an IP/WDM network.

FIG. 4 is a block diagram of an IP/WDM network 4 to be evaluated by using the network evaluation apparatus 2. The IP/WDM network 4 includes nodes A, B, C, D, E, F, 50, 51, 52, 53, 54, 55, and links A-F, F-50, 50-51, 51-E, F-52, 52-D, F-53, 53-54, 54-C, F-55, 55-B. Here, the link is an optical fiber connecting between the nodes. For example, the link A-F is the optical fiber connecting between the node A and the node F.

Numerals alongside the optical fibers indicate lengths of their respective links. In the present embodiment, the length of the optical fiber is 500 km in the link A-F, 300 km in the link F-50, 200 km in the link 50-51, 300 km in the link 51-E, 200 km in the link F-52, 400 km in the link 52-D, 1100 km in the link F-53, 1400 km in the link 53-54, 900 km in the link 54-C, 1100 km in the link F-55, and 1200 km in the link 55-B.

Below, an evaluation process of the network evaluation apparatus 2 is described for a case where the IP/WDM network 4 of FIG. 4 is evaluated.

FIGS. 5A and 5B are table diagrams relating to the IP/WDM network 4 of FIG. 4. FIG. 5A is the table diagram indicating the physical topology data 26 of the IP/WDM network 4. The table indicated in FIG. 5A is stored in the memory unit 22. FIG. 5B is the table diagram indicating the demand table 27 of the IP/WDM network 4. The demand table 27 indicated in FIG. 5B is stored in the memory unit 22.

FIG. 5A is a table diagram indicating nodes connected to a start point and an end point of each optical fiber and a length of the optical fiber. In FIG. 5A, a column 60 indicates a start point node, a column 61 indicates an end point node, and a column 62 indicates the length of the optical fiber.

Each line of the table diagram of FIG. 5A indicates the start point node, the end point node, and the length of each link. For example, a line 63 indicates that the start point node of the link is A, the end point node is F, and the length is 500 km. The same applies to the other lines.

FIG. 5B is a demand data table diagram indicating information of each demand. In FIG. 5B, a column 64 indicates a traffic start point node, a column 65 indicates a traffic end point node, and a column 66 indicates a traffic volume demand value that is desirable in between those nodes.

Each line of the table diagram of FIG. 5B indicates, for each demand, the start point node, the end point node and the traffic volume demand value of a network segment. For example, a line 67 indicates that the start point node of the segment where the demand is set is A, the end point node is B, and the traffic volume demand value is 8 Gbps. The same applies to the other lines.

As described above, the network evaluation apparatus 2 stores information relating to the IP/WDM network 4 to be evaluated in the memory unit 22.

Figure 6:
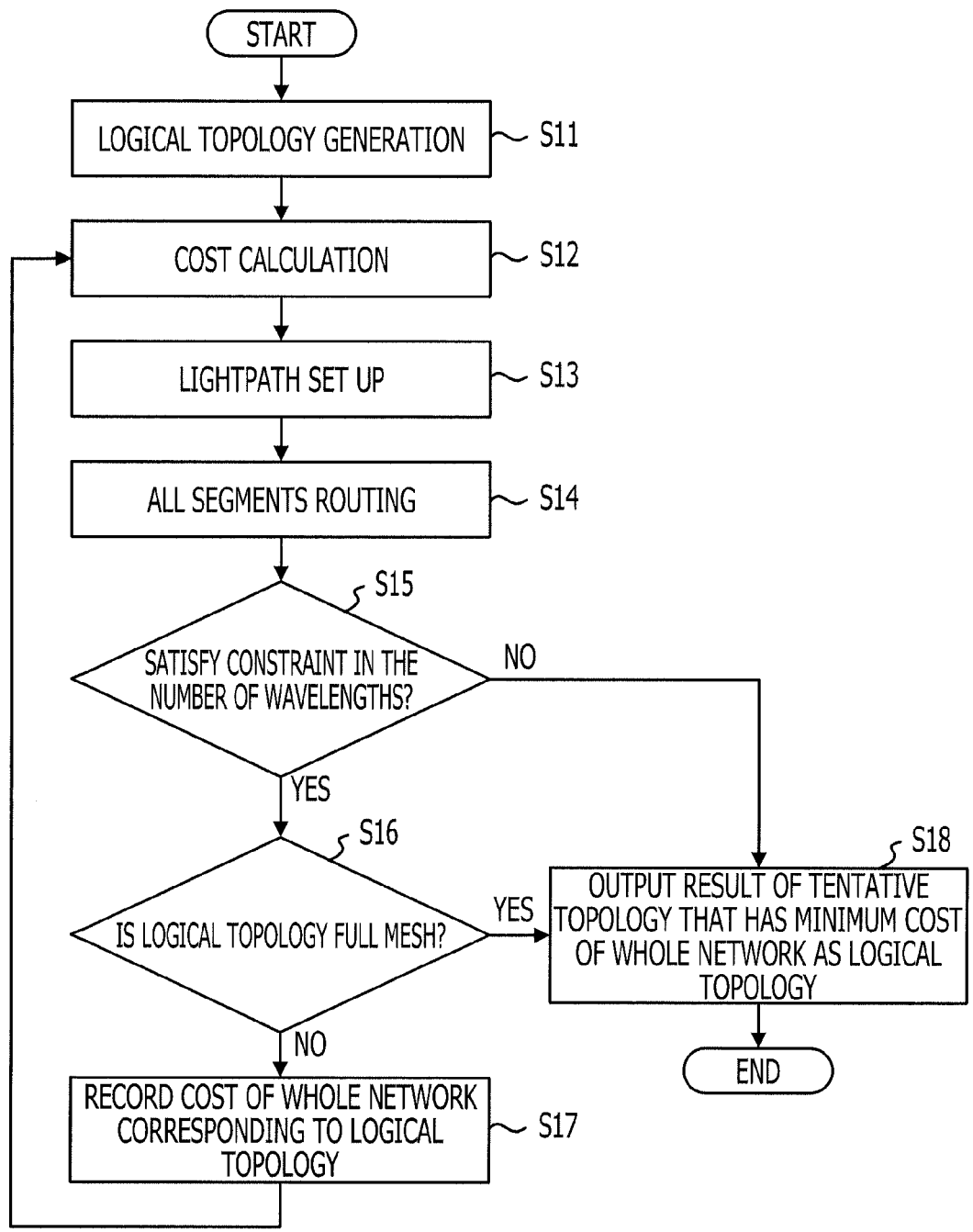
FIG. 6 is an evaluation process flow chart of the network evaluation apparatus.

FIG. 6 is a flow chart of the evaluation process of the network evaluation apparatus 2 performed on an IP/WDM network. In the network evaluation apparatus 2, the logical topology generation unit 45 generates logical topology data that becomes the initial value of the evaluation process, based on the physical topology data 26 and the demand table 27 (S11).

The cost calculation unit 40 calculates an increased cost and a decreased cost of the IP/WDM network for a case where the lightpath is set up in a segment in which the demand value is specified, based on the logical topology data generated (S12).

The demand evaluation unit 44 sets up the lightpath in the segment that has the highest reduction effect in the total cost, based on cost calculation results calculated by the cost calculation unit 40 for their respective demands (S13).

The demand evaluation unit 44 allows each of the nodes to perform a routing process for all the segments including the segments where the demand values are set (S14). Each link has the upper limit in the number of switchable wavelengths of optical signals. By performing the routing process, the demand evaluation unit 44 checks whether or not the number of switchable wavelengths of optical signals satisfies a constraint at each link (S15).

When the number of switchable wavelengths of optical signals satisfies the constraint at each link (S15: YES), the demand evaluation unit 44 continues the evaluation process. When the number of switchable wavelengths of optical signals does not satisfy the constraint at any link (S15: NO), the logical topology update unit 43 updates the logical topology data stored in the memory unit 22, based on an evaluation result obtained by the demand evaluation unit 44 (S18). Furthermore, the logical topology update unit 43 updates the wavelength count table 85 based on a new logical topology data after the updating.

After the consideration on the number of wavelengths, the demand evaluation unit 44 further determines whether or not the logical topology is full mesh (S16). Here, the full mesh means a state where the lightpaths are set up in all combinations of pairs of nodes. When the logical topology is the full mesh (S16: YES), no further evaluation is performed. Accordingly, the logical topology update unit 43 updates the logical topology data stored in the memory unit 22, based on the evaluation result by the demand evaluation unit 44 (S18).

When the logical topology is not the full mesh (S16: NO), the logical topology update unit 43 records the total cost of the whole IP/WDM network corresponding to the logical topology (S17). The network evaluation apparatus 2 repeats the process of from the step S12 to the step S18.

As described above, the network evaluation apparatus 2 may be able to evaluate the network while considering the increased cost and the decreased cost generated by the lightpath setting.

FIG. 7 is an evaluation result table 7 of the total costs of their respective demands obtained by the demand evaluation unit 44. In the evaluation result table 7, columns 75 and 76 indicate the segment and the traffic volume demand value obtained by referring to the demand table of FIG. 5B, respectively.

In the evaluation result table 7, a column 77 indicates a hop count in the segment designated in the column 75. The hop count is the number of links which the lightpath passes through when the lightpath is set up in the segment where the demand is specified. A column 78 indicates a decreased value of cost corresponding to the hop count of the column 77. A column 79 indicates an increased value of cost associated with the optical regenerator insertion when the length of the segment indicated in FIG. 5A is considered. A column 80 indicates an evaluation value of the total cost based on the decreased value of cost and the increased value of cost.

In the evaluation of IP/WDM network 4, preconditions are determined as follows, for example. In the IP/WDM network 4, a capacity of a single wavelength is 20 Gbps; the number of wavelengths that may be multiplexed at a single link is three; the maximum installation distance, with which setting of an optical regenerator is desirable, is 1500 km; and a cost ratio among a WDM port to be mounted in the OXC, the optical regenerator, and a single IP port to be mounted in the router is 1:2:5. The preconditions may be stored in the memory unit 22 in advance, or may be input through the input unit 24.

The decreased value of cost is calculated by the decreased cost calculation unit 42. The decreased value of cost may be calculated by the following formula, for example, the decreased value=(hop count−1)×(traffic volume demand value)×(sum of costs of single IP port and WDM port).

The increased value of cost is calculated by the increased cost calculation unit 41. The increased value of cost may be calculated by the following formula, for example, the increased value=(traffic volume demand value)×(the number of optical regenerators desirable to add)×(cost of single optical regenerator).

In the evaluation result table 7, lines 71-74 indicate evaluation results of the total cost in their respective designated segments. The line 71 indicates the evaluation result for a case where the lightpath is set up in a segment AB of the IP/WDM network 4. The line 72 indicates the evaluation results for a case where the lightpath is set up in a segment AC of the IP/WDM network 4. The line 73 indicates the evaluation results for a case where the lightpath is set up in a segment AD of the IP/WDM network 4. The line 74 indicates the evaluation results for a case where the lightpath is set up in a segment AE of the IP/WDM network 4.

For example, in the case of the line 71, the traffic volume demand value in the segment AB is 8 Gbps, and the hop count is three. Furthermore, from FIG. 4, the distance of the segment AB is 2800 km. According to the above conditions, the decreased value of cost in the segment AB is calculated as $(3-1) \times 8 \times (1+5) = 96$. On the other hand, the increased value of cost in the segment AB is calculated as $8 \times 2 \times 2 = 32$. Thus, the evaluation value is calculated as $96-32=64$.

Calculations similar to that of the segment AB are carried out for the segments AC, AD and AE. According to those calculation results, it is found that the largest decreased value of cost is obtained in the segment AB from the line 71 when the increased value of cost relating to the distance is not considered. On the other hand, when the increased value of cost is being considered, the cost increase due to the optical regenerator installation is calculated as zero in the segments AD and AE since the two-node distances in those segments are equal to or less than 1500 km. Accordingly, when the evaluation values reflecting the increased values of cost are being considered, it is found, from the line 80, that the segment AD has the highest evaluation value.

In the network evaluation apparatus 2, based on the calculation results of the cost calculation unit 40, the demand evaluation unit 44 notifies the logical topology update unit 43 of information requesting setting up of the lightpath in the segment AD. Following the information notified, the logical topology update unit 43 updates the logical topology data 28 with a logical topology in which the lightpath is set up in the segment AD.

As described above, the network evaluation apparatus 2 may be able to evaluate the network topology while considering the increased cost due to the optical regenerator installation based on the two-node distance.

Figure 8:
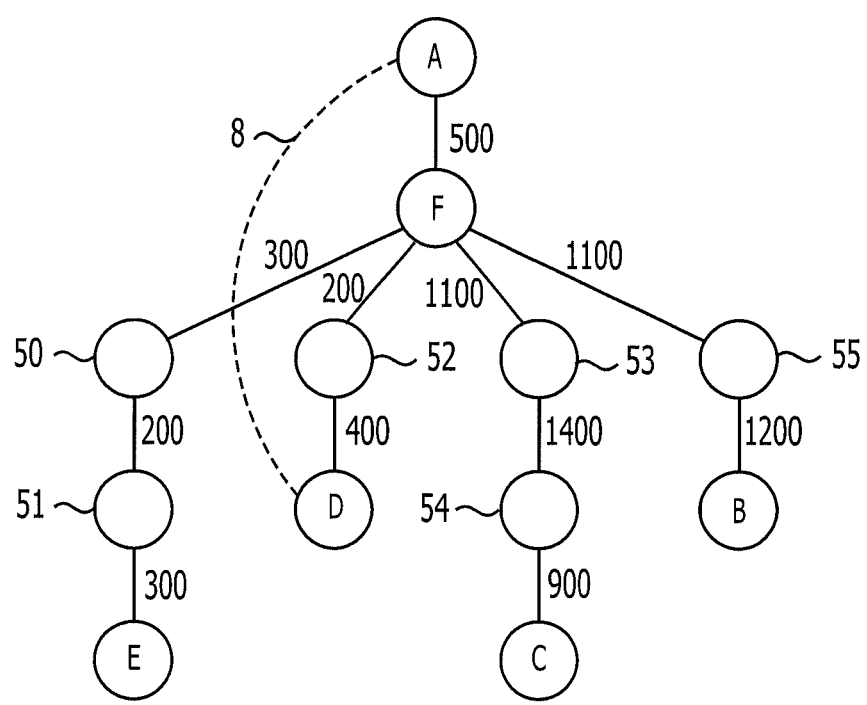
FIG. 8 is a block diagram of an IP/WDM network where a lightpath is set up in a segment AD.

FIG. 8 is a block diagram of an IP/WDM network 4a where the lightpath is set up in the segment AD of the IP/WDM network 4. In the IP/WDM network 4a, like reference numerals denote like members to those of the IP/WDM network 4, and descriptions thereof are omitted.

In FIG. 8, a lightpath 8 is set up from the node A to the node D. In the segment where the lightpath is set up, optical signals go through the node F and the node 52 in reality. As described above, the maximum number of wavelengths that may be multiplexed at each node is three. Turning attention to a segment between the nodes A and F, one wavelength is used for the lightpath between the nodes A and D, and one wavelength is used for transmitting other signals. Thus, there is one remaining wavelength.

FIG. 9 is a wavelength count table that keeps track of the number of used wavelengths in each link after setting up the lightpath between the nodes A and D. The wavelength count table 85 is stored in the memory unit 22.

In the wavelength count table 85, a column 91 indicates a link segment. A column 92 indicates one or more of the segments, which pass through the link indicated in the column 91, of the segments designated in the demand table 27. Of passing designated segments indicated in the column 92, a column 93 indicates the segment corresponding to the demand for which the lightpath is set up. A column 94 indicates the number of wavelengths to be used for transmitting optical signals that go through the link indicated in the column 91.

Each line of the wavelength count table 85 indicates the passing designated segments, a lightpath segment, and the number of used wavelengths for each link. For example, a line 95 indicates that, for the link A-F, the passing designated segments are A-B, A-C, A-D and A-E; of those passing designated segments, the lightpath is set up in the segment A-D; and the number of used wavelengths is two. In other words, the line 95 indicates that, in the link A-F, two wavelengths are used for the lightpath set up in the segment A-D and for carrying a traffic volume designated by another demand.

A line 96 indicates that, for the link F-55, the passing designated segment is A-B; no lightpath is set up; and the number of used wavelengths is one. A line 97 indicates that, for the link F-52, the passing designated segment is A-D; the lightpath is set up between the nodes A and D; and the number of used wavelengths is two, which is calculated by adding one wavelength for the lightpath and one wavelength set for a physical link.

Referring to the column 94 of the wavelength count table 85, it is found that, in none of the links, the wavelength count reaches three, the maximum number of wavelengths available for use. Accordingly, the logical topology update unit 43 may be able to determine whether or not an additional lightpath may be possible to set up by setting the wavelength count table 85.

FIG. 10 is an evaluation result table 7a indicating the total costs for their respective designated segments after setting up the lightpath between the nodes A and D. In the evaluation result table 7a, like reference numerals denote like elements to those of the evaluation result table 7, and descriptions thereof are omitted.

Each line of the evaluation result table 7a indicates the evaluation result of each segment. Since the lightpath is set up between the nodes A and D, the evaluation result table 7a is the one resulted by deleting the line 73 of the evaluation result table 7.

When focusing on the decreased values of cost in the column 78 of the lines 71, 72 and 74, it is found that the segment AB in the line 71 has the largest decreased value of cost. On the other hand, when the increased value of cost due to the optical regenerator installation is considered, the segment AE has the highest evaluation value.

Accordingly, in the network evaluation apparatus 2, the demand evaluation unit 44 notifies the logical topology update unit 43 of information requesting setting up of the lightpath in the segment AE in addition to the segment AD. Following the information notified, the logical topology update unit 43 updates the logical topology data 28 with a logical topology in which the lightpaths are each set up in the segment AD and the segment AE.

As described above, the network evaluation apparatus 2 may be able to evaluate the network topology while considering the increased cost due to the optical regenerator installation based on the two-node distance.

Figure 11:
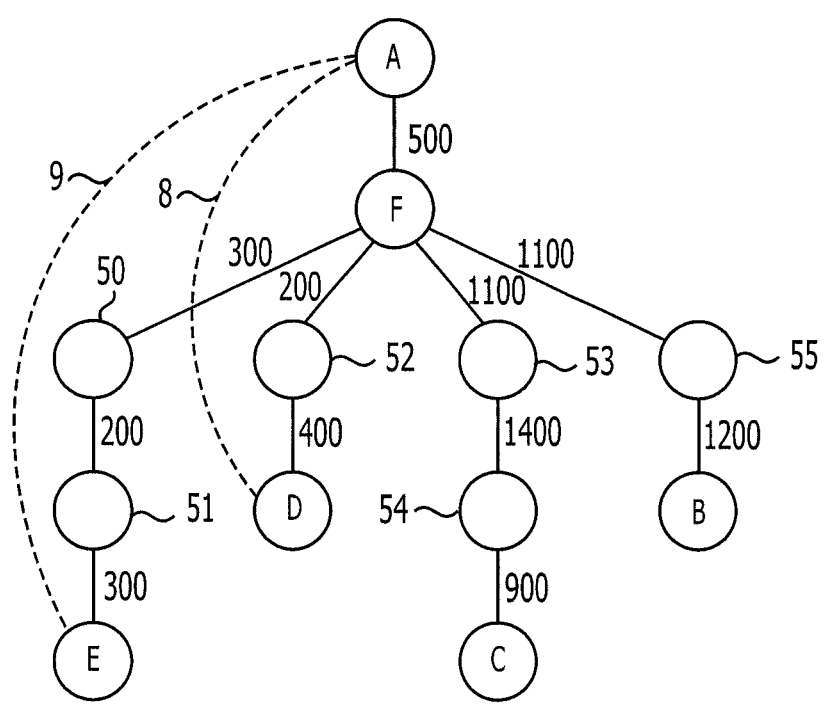
FIG. 11 is a block diagram of an IP/WDM network where lightpaths are each set up in the segment AD and a segment AE.

FIG. 11 is a block diagram of an IP/WDM network 4b in which the lightpaths are each set up in the segment AD and the segment AE of the IP/WDM network 4. In the IP/WDM network 4b, like reference numerals denote like members to those of the IP/WDM network 4, and descriptions thereof are omitted.

In FIG. 11, in addition to the lightpath 8, a lightpath 9 is set up from the node A to the node E. Both optical signals of the segment AD and the segment AE, in which the lightpaths are set up therein, go through the link A-F.

FIG. 12 is a wavelength count table 85a that keeps track of the number of used wavelengths in each link after setting up the lightpaths in the segment AD and the segment AE. In the wavelength count table 85a, like reference numerals denote like members to those of the wavelength count table 85, and descriptions thereof are omitted.

In a line 95a of the wavelength count table 85a, two segments, the segments AD and AE, are the segments in which the lightpaths are set up, among the designated segments that go through the link A-F. Accordingly, the number of used wavelengths becomes three in the link A-F. In a line 98, the number of used wavelengths becomes two in the link F-50 since the additional lightpath is set up in the segment AE.

As described above, the maximum number of wavelengths that may be multiplexed in each link is three. Turning attention to the link A-F of the line 95a, one wavelength is used for the lightpath between the nodes A and D, one wavelength is used for the lightpath between the nodes A and E, and one remaining wavelength is used for transmitting another signal. Accordingly, in the link A-F, the number of used wavelengths becomes three, which is the maximum number of wavelengths that may be multiplexed.

The logical topology update unit 43 checks the number of used wavelengths of optical signals in each link, based on the wavelength count table 85a thus updated. In the present embodiment, the logical topology update unit 43 determines that the number of used wavelengths in the link A-F is three.

The network evaluation apparatus 2 ends the cost calculation process when the number of used wavelengths reaches the maximum value in any one of the links.

As described above, the network evaluation apparatus 2 may be able to continue the evaluation of a network topology that includes the setting up of the lightpath until the wavelength count reaches the number of switchable wavelengths at any one of the nodes.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A network evaluation apparatus for an optical network including a plurality of nodes, the network evaluation apparatus comprising:
   a memory; and
   a processor coupled to the memory and configured to:
      calculate a decreased cost in a case where a lightpath has a route between a node pair among the plurality of nodes, the decreased cost being calculated in accordance with a reduction of a relay process in Internet Protocol (IP) layer between the node pair through which the lightpath passes, calculate an increased cost for the lightpath in accordance with use of an optical regenerator to perform regenerative relaying between the node pair through which the lightpath passes, the use of the optical regenerator being caused by the reduction of the relay process, evaluate a total cost according to the calculated decreased cost and the increased cost, and determine whether the lightpath is set to the route, based on the evaluated total cost.

2. The network evaluation apparatus according to claim 1, wherein the increased cost is calculated based on at least one of a cost of the optical regenerator and a distance of the route.

3. The network evaluation apparatus according to claim 1, wherein the decreased cost is calculated based on at least one of a cost of an IP port, a cost of a Wavelength Division Multiplexing (WDM) port, and a hop count of the route.

4. A non-transitory computer-readable recording medium having stored therein a network evaluation program for causing a computer to execute a process, the process comprising:

calculating a decreased cost in a case where a lightpath has a route between a node pair among the plurality of nodes, the decreased cost being calculated in accordance with a reduction of a relay process in Internet Protocol (IP) layer between the node pair through which the lightpath passes;

calculating an increased cost for the lightpath in accordance with use of an optical regenerator to perform regenerative relaying between the node pair through which the lightpath passes, the use of the optical regenerator being caused by the reduction of the relay process, evaluating a total cost according to the calculated decreased cost and the increased cost; and determining whether the lightpath is set to the route, based on the evaluated total cost.

5. The non-transitory computer-readable recording medium according to claim 4, comprising:

storing a number of wavelengths of at least one lightpath to be set to an optical network, and the at least one lightpath is set based on the number of wavelengths.

6. The non-transitory computer-readable recording medium according to claim 4, wherein the increased cost is calculated based on at least one of a cost of the optical regenerator and a distance of the route.

7. The non-transitory computer-readable recording medium according to claim 4, wherein the decreased cost is calculated based on at least one of a cost of an IP port, a cost of a Wavelength Division Multiplexing (WDM) port, and a hop count of the route.

8. A network evaluation method, comprising:

calculating a decreased cost in a case where a lightpath has a route between a node pair among the plurality of nodes, the decreased cost being calculated in accordance with a reduction of a relay process in Internet Protocol (IP) layer between the node pair through which the lightpath passes;

calculating an increased cost for the lightpath in accordance with use of an optical regenerator to perform regenerative relaying between the node pair through which the lightpath passes, the use of the optical regenerator being caused by the reduction of the relay process;

evaluating a total cost according to the calculated decreased cost and the increased cost; and determining whether the lightpath is set to the route, based on the evaluated total cost.

9. The non-transitory computer-readable recording medium according to claim 8, comprising:

storing a number of wavelengths of at least one lightpath to be set to an optical network, and the at least one lightpath is set based on the of wavelengths.

10. The non-transitory computer-readable recording medium according to claim 8, wherein the increased cost is calculated based on at least one of a cost of the optical regenerator and a distance of the route.

11. The non-transitory computer-readable recording medium according to claim 8, wherein the decreased cost is calculated based on at least one of a cost of an IP port, a cost of a Wavelength Division Multiplexing (WDM) port, and a hop count of the route.

12. The network evaluation apparatus according to claim 1, wherein the memory is configured to store a number of wavelengths of at least one lightpath to be set to the optical network, and the network evaluation apparatus sets the at least one lightpath based on the number of wavelengths.

* * * * *